June 30, 1970  K. S. LINDMARK  3,517,471
METHOD OF JOINING LOGS AND THE RESULTING STRUCTURE WITH
A CLAMP USED THEREIN
Filed March 25, 1968  2 Sheets-Sheet 1
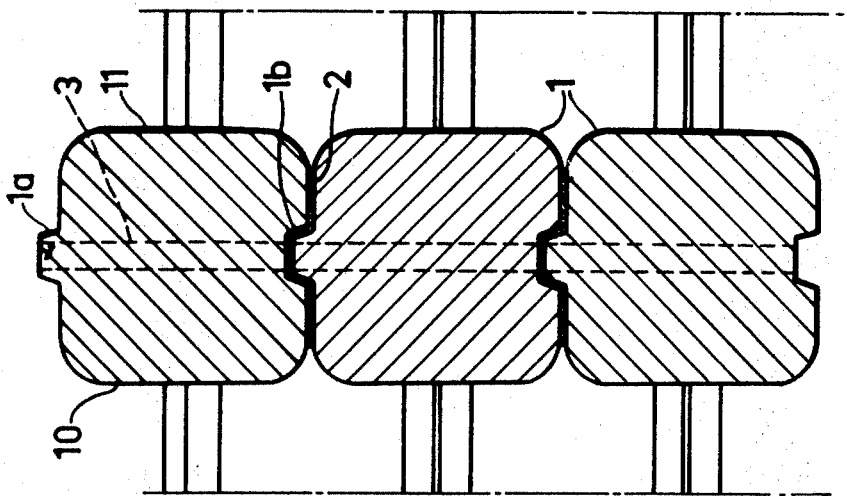
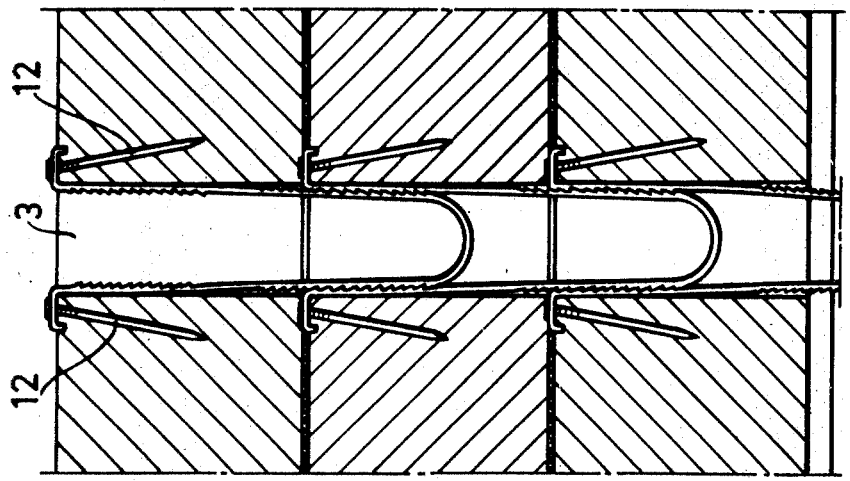

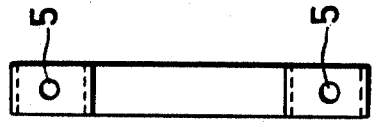
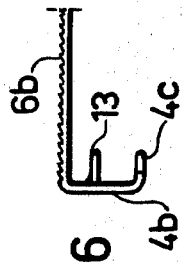
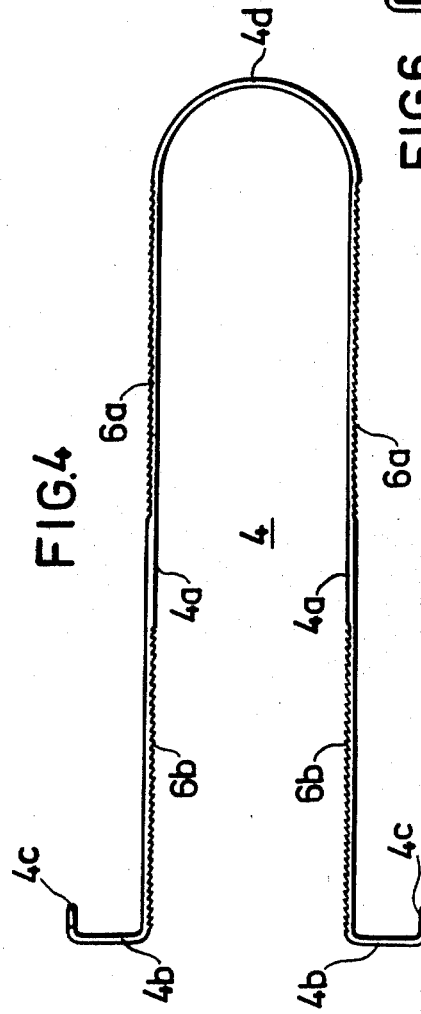

United States Patent Office 3,517,471
Patented June 30, 1970

3,517,471
METHOD OF JOINING LOGS AND THE RESULTING STRUCTURE WITH A CLAMP USED THEREIN
Karl Signar Lindmark, Cityhuset, Jokkmokk, Sweden
Filed Mar. 25, 1968, Ser. No. 715,670
Int. Cl. E04b 1/10, 1/48
U.S. Cl. 52—233                 9 Claims

ABSTRACT OF THE DISCLOSURE

The logs of a log house or the like are provided with aligned vertically extending holes. U-shaped clamps inserted in the holes extend into like clamps in lower logs and thereby hold the logs securely in position.

---

This invention relates to a method of joining logs or other building elements and to a clamp for use in such method.

Hitherto logs, which are intended to be used as a building material for building log houses, are provided with holes or recesses and then laid crosswise or in other ways to form walls or other parts of a building. The logs may be planed on the surfaces of contact and interlocked in a known way. Between the logs, packings may be placed for preventing a circulation of air through the walls and an entrance of moisture. Furthermore it is known to join the logs by plugs, hooks, nails, screws and the like.

All these methods and devices are, however, insufficient for giving the walls a high stability and density, especially for a long period of time. The great forces which arise in the wood are very often underestimated. For that reason, log houses frequently have cracks in and between the logs as well as warped walls, and jammed doors and windows. As the logs in course of time become harder and harder, there is no chance later to rectify such faults.

Accordingly, an object of the invention is to eliminate these disadvantages and to provide an improved method of joining logs and a clamp by means of which logs can be joined in a more effective way.

These and other features, objects and advantages will become apparent from the following description taken in connection with the accompanying drawings of a preferred and not limiting embodiment of the invention wherein:

FIG. 1 is a vertical longitudinal section of a log house wall, the logs of which are interlocked according to the new method and secured by clamps according to the invention.

FIG. 2 is a vertical transverse section of the same wall (the clamps are not shown).

FIG. 3 is a front view of one of the clamps.

FIG. 4 is a top plan view of the same clamp.

FIG. 5 is a view as seen from the left-hand side of FIG. 4.

FIG. 6 is a fragmentary side view of a portion of a clamp showing a modification.

The logs, which will be used for a log house, are first treated as hitherto, i.e. barked, cut milled, planed and drilled. An example of completely treated logs is shown in FIGS. 1 and 2, in which the logs 1 have planed longitudinal sides 10 and 11 parallel with and opposite to each other. On their upper surfaces, the logs are provided with a longitudinal, trapezoidal tongue 1a, which fits into a trapezoidal groove 1b in the underside of the next log above. Between the logs, there is placed a packing 2 which is preferably of foamed plastic material and which is sufficiently wide that it covers completely the adjacent surfaces including the tongue.

Either after or between the above mentioned operations, the logs are provided with through holes 3 which extend vertically at right angles to the upper and lower surfaces of the logs and which are arranged at suitable distances from each other. In the example shown, the holes 3 have rectangular cross sections depending on the form of the clamps used. When setting up a wall or the like, the holes 3 lie in line with the corresponding holes in the other logs. In this way the holes extend vertically of the whole wall. Depending on the dimensions of the logs, the holes in a single log may be arranged in one line or may be offset so as to lie in two or more lines for eliminating the risk of the logs splitting in a longitudinal direction. Normally the holes 3 are arranged centrally in one line as apparent from FIG. 2.

The next operation is to set up logs together with clamps to form a wall or the like as shown in FIG. 1. This operation is described below together with a description of the clamp.

In the example shown in FIGS. 3 to 5, the clamp 4 is a U-shaped metal strip. The web 4d of the clamp is preferably rounded outwardly as seen in FIG. 4 to make the insertion of the clamp easier. The legs or ends of the shanks 4a of the U-shaped clamp are bent outwardly to form outwardly projecting parts 4b at right angles to the legs or shanks. The end portions of these parts 4b are bent down to form sharp material-piercing edges 4c. The parts 4b are provided with through holes 5 so that they can be fastened on the logs by nails 12 or the like, as shown in FIG. 1. Alternatively, the parts 4b may be provided with nail-like flaps which are punched out of the metal strip and which also have sharp, material-piercing edges.

This is illustrated by way of example in FIG. 6 where a pointed flap 13 is shown punched out of the metal of the part 4b.

Near the web 4d, the shanks 4a are provided with outer locking surfaces 6a, while the end portions of the shanks have locking surfaces 6b on their inside. These surfaces consist of rows of teeth extending at right angles to the longitudinal direction of the metal strip. According to a prefered embodiment of the invention, the inner teeth are pointed or directed obliquely downwards (in the direction towards the web), while the outer teeth are pointed or directed obliquely upwards (in the direction towards the edges 4c). This arrangement makes the insection of the clamps into each other very easy and prevents any sliding backwards.

When setting up a wall or the like, the clamps are inserted into the holes in the first (lowest) log, so that the edges 4c penetrate into the upper surface of the log. Then the parts 4b are additionally fastened by nails 12 or the like, if desired. After this, the next log is placed on the first, so that the groove 1b of the upper log received the tongue 1a of the lower log and the holes 3 are in line with one another. Then clamps are inserted into the holes of the upper log and fastened in the same way. When thus inserted, the second clamps penetrate into the first clamps, so that the inner surfaces 6b of the first clamps interlock with the outer surfaces 6a of the second clamps. As a consequence of the described form of the clamps, especially with teeth of the preferred configuration as described, any backwards movement of the second clamps is impossible. The following logs are attached to the foregoing ones in the same way. When the wall is completed, the clamps form a homogeneous bond throughout the height of the wall.

A great advantage with the new method is that the contraction of the wood does not cause cracks between the logs, because the clamps in that case are pushed automatically and successively deeper into each other as a result of the weight of the wall. If it is wished to avoid setting of the walls, it is possible to provide the clamps with suitable stop bolts or the like to limit their downward movement.

The clamps and/or the holes in the logs are dimensioned in such a way, that the outer flat side and the side edges of each shank lie against the walls of the holes. Hereby the clamps are guided automatically and cannot be displaced in a horizontal direction. Furthermore it is advantageous for the clamps to fit into each other with a certain strain, so that the interlocking flanks of the interengaging clamps are pressed firmly against each other. An additional step, which may be necessary in case of very great strains, is to brace the shanks between the walls of the holes with a wood block or the like or by filling the holes with a setting mass, e.g. synthetic resin after insertion of the clamps.

In the illustrated example, the clamps are so long that they extend through a log and penetrating half way into the next. It is also possible to make the clamps so long that they extend through at least two logs and penetrate into the third log, so that each even numbered log is not provided with a clamp but is braced between two logs with an odd number. The advantage of this is generally work and material saving.

Further modifications consist in giving the lowest clamp such a shape, that the web is located directly below the inner rows of the teeth, because there is generally no use for the outer teeth of the lowest clamp. The lowest clamp can furthermore have additional fastening devices as a compensation for fastening in an underlying clamp. The locking surfaces may, for example, have wavelike projecting means instead of teeth. It is also possible and within the scope of the invention to give the clamps other than a strip-shape, for example, or a more compact shape.

The clamp according to the invention can be produced in an easy and simple way. The clamp can be made of metal and/or plastic, for example, metal wiht a plastic coating.

It is to be understood that the method according to the invention is not limited to the application for walls. Even floors, roofs, doors and frame works can be made with clamps according to the method of the invention.

What I claim is:

1. A method of joining logs and like building elements having opposed surfaces comprising: providing the logs with through holes, said holes being arranged to lie in line with corresponding holes in the other logs when placed one on top the other; inserting into the hole of a log a first U-shaped clamp having legs provided with outer locking surfaces at its front end portion and having inner locking surfaces and outwardly projecting flanges at its rear end portion; placing the next log on the preceding log with said holes aligned; inserting and driving a second clamp similar to said first clamp into the hole of said next log until the front end portion having the outer locking surfaces of the second clamp overlaps and locks with at least a portion of said rear end portion having the inner locking surfaces of said first clamp and the flanges lie against the outer surface of said next log; and fastening other logs in the same way.

2. A method as claimed in claim 1, further comprising inserting a block between the legs of a clamp after its insertion in said hole to stiffen said legs and hold them in firm engagement with the walls of said hole.

3. A method as claimed in claim 1, further comprising at least partially filling said hole, after insertion of said clamp, with settable material to stiffen the legs of said clamp and hold them in firm engagement with the walls of said hole.

4. A clamp for joining together building pieces, comprising a strip having inner and outer opposed major surfaces, said strip having two leg portions extending in a generally common direction and a web portion interconnecting said two leg portions, and locking projections on said inner and outer major surfaces of both said leg portions for locking said clamp in place, said inner projections comprising inner teeth pointed towards said web portion and said outer projections comprising outer teeth pointed towards ends of said leg portions, both legs having ends extending outwardly from said leg portions and constituting flanges.

5. A clamp according to claim 4, in which said flanges are provided with through holes to receive fastening means.

6. A clamp according to claim 5, in which said flanges have outer end sections extending substantially parallel to said leg portions in a direction towards said web portion and have sharp, material-piercing edges.

7. A clamp according to claim 4, further including a projection on each of said flanges, each projection extending substantially parallel to a leg portion in a direction towards said web portion and having sharp, material-piercing edges.

8. A log structure comprising: a plurality of superposed logs having aligned holes extending therethrough; a plurality of clamps nested one within the other positioned within said aligned holes wherein each of said holes has a clamp inserted therein; each of said clamps comprising a strip having inner and outer opposed major surfaces, said strip having two leg portions and a web portion interconnecting said two leg portions, and locking projections on said inner and outer major surfaces at both said leg portions; and wherein said locking projections on one major surface of one clamp engage with the locking projections on the other major surface of an adjoining clamp to lock said clamps and thereby said logs together.

9. A structure according to claim 8, in which the clamp extends through two logs and into a corresponding clamp in a third log.

References Cited

UNITED STATES PATENTS

| 1,340,752 | 5/1920 | Cordery | 52—374 |
| 1,825,195 | 9/1931 | McAvoy et al. | 52—585 X |
| 2,563,703 | 8/1951 | Bonney | 52—233 |
| 2,777,172 | 1/1957 | Debbink | 52—584 |
| 3,166,873 | 1/1965 | Rosenfeld | 52—585 X |
| 841,998 | 1/1907 | Mulford | 52—584 |
| 2,318,776 | 5/1943 | Haug | 85—13 X |
| 2,352,884 | 7/1944 | Brinker | 52—579 X |

OTHER REFERENCES

American Builder, NA1A35, February 1933, pp. 33, 52–233.

ALFRED C. PERHAM, Primary Examiner

U.S. Cl. X.R.

52—585, 712, 744; 85—13